US009251547B2

(12) United States Patent
Fontaine et al.

(10) Patent No.: US 9,251,547 B2
(45) Date of Patent: Feb. 2, 2016

(54) METHOD AND SYSTEM FOR PLACING A WAGER ON A PARI-MUTUEL EVENT

(76) Inventors: Anthony L. Fontaine, Henderson, NV (US); Michael Staw, Westport, CT (US)

( * ) Notice: Subject to any disclaimer, the term of this patent is extended or adjusted under 35 U.S.C. 154(b) by 629 days.

(21) Appl. No.: 13/507,444

(22) Filed: Jun. 29, 2012

(65) Prior Publication Data

US 2012/0276989 A1 Nov. 1, 2012

Related U.S. Application Data

(63) Continuation of application No. 12/315,786, filed on Dec. 4, 2008, now Pat. No. 8,241,114.

(51) Int. Cl.
*A63F 13/00* (2014.01)
*G06Q 50/34* (2012.01)
*G07F 17/32* (2006.01)

(52) U.S. Cl.
CPC ................ *G06Q 50/34* (2013.01); *G07F 17/32* (2013.01); *G07F 17/3288* (2013.01)

(58) Field of Classification Search
CPC G07F 17/3288; G07F 17/323; A63F 3/00157
USPC ................................................ 463/20, 25, 28
See application file for complete search history.

(56) References Cited

U.S. PATENT DOCUMENTS

| | | | | |
|---|---|---|---|---|
| 6,296,569 | B1 * | 10/2001 | Congello, Jr. | 463/17 |
| 2004/0235542 | A1 * | 11/2004 | Stronach et al. | 463/6 |
| 2005/0181868 | A1 * | 8/2005 | Vlazny et al. | 463/28 |
| 2007/0082730 | A1 * | 4/2007 | Brown | 463/25 |
| 2007/0197281 | A1 * | 8/2007 | Stronach | 463/28 |
| 2008/0207310 | A1 * | 8/2008 | Mindes | 463/25 |
| 2008/0254863 | A1 * | 10/2008 | Smith | 463/25 |

* cited by examiner

*Primary Examiner* — Allen Chan
(74) *Attorney, Agent, or Firm* — Hayes Soloway PC

(57) ABSTRACT

A method and system is provided to permit placing a wager on a pari-mutuel event in which expert handicapper's prognoses are displayed to a player to permit them to formulate either simple or complicated exotic wagers, and to be able to aggregate a wager with those of other players to satisfy wagering minimums.

18 Claims, 14 Drawing Sheets

Fig. 1

Bet Types

Straight Bets
- Win must finish first
- Place may finish first or second
- Show may finish first second or third

| | Win | Place | Show | <=Order of Finish |
|---|---|---|---|---|
| Win | Collect | Lose | Lose | |
| Place | Collect | Collect | Lose | |
| Show | Collect | Collect | Collect | |

Exotic Bets Exacta Horses Picked in Exact order of finishing
Pick 1 must Win
Pick 2 must Place

| Horse | | Win | Place | Show | <=Order of Finish |
|---|---|---|---|---|---|
| Horse 1 | Win | Collect | Lose | Lose | |
| Horse 2 | Place | Lose | Collect | Lose | |
| | Show | Lose | Lose | Lose | |

Wagering Styles

Across the Board
*The same bet on each of the three straight bet types*

| **Across the Board** | | Win | Place | Show | <=Order of Finish |
|---|---|---|---|---|---|
| | Win | Collect | Collect | Collect | |
| | Place | Lose | Collect | Collect | |
| | Show | Lose | Lose | Collect | |

Exacta Box (Quinella) *2 horses picked* Either horse finishes in exact order
Either horse must win Win AND
Either horse must Place

| Horse | | Win | Place | Show | <=Order of Finish |
|---|---|---|---|---|---|
| Horse 1 or 2 | Win | Collect | Collect | Lose | |
| Horse 1 or 2 | Place | Collect | Collect | Lose | |
| | Show | Lose | Lose | Lose | |

Exacta Box *3 horses picked* Any of Three Horses Must Win AND
Any of Three Horses Must Place

| Horse | | Win | Place | Show | <=Order of Finish |
|---|---|---|---|---|---|
| Horse 1,2 or 3 | Win | Collect | Collect | Lose | |
| Horse 1,2 or 3 | Place | Collect | Collect | Lose | |
| | Show | Lose | Lose | Lose | |

Exacta Box with Keyed Horses *3 horses picked* Pick #1 Keyed to Win(Same concept Applies to Place and Show Keys) Either of other two horses must Place

| Horse | | Win | Place | Show | <=Order of Finish |
|---|---|---|---|---|---|
| Horse 1 | Win | Collect | Lose | Lose | |
| Horse 2 or 3 | Place | Lose | Collect | Lose | |
| | Show | Lose | Lose | Lose | |

Exacta Wheel *4 horses picked* Pick #1 Keyed to Place (Same concept Applies to Place and Show Keys) Picks 2, 3 or four to win

| Horse | | Win | Place | Show | <=Order of Finish |
|---|---|---|---|---|---|
| Horse 2, 3 or 4 | Win | Collect | Lose | Lose | |
| Horse 1 | Place | Lose | Collect | Lose | |
| | Show | Lose | Lose | Lose | |

*Fig. 2*

Bet Types

Trifecta Horses Picked in Exact order of finishing
Pick 1 must Win
Pick 2 must Place
Pick 3 must Show

| Horse | | Win | Place | Show | <=Order of Finish |
|---|---|---|---|---|---|
| Horse 1 | Win | Collect | Lose | Lose | |
| Horse 2 | Place | Lose | Collect | Lose | |
| Horse 3 | Show | Lose | Lose | Collect | |

| Horse | | Win | Place | Show | Fourth | <=Order of Finish |
|---|---|---|---|---|---|---|
| Horse 1 | Win | Collect | Lose | Lose | Lose | |
| Horse 2 | Place | Lose | Collect | Lose | Lose | |
| Horse 3 | Show | Lose | Lose | Collect | Lose | |
| Horse 4 | Fourth | Lose | Lose | Lose | Collect | |

Wagering Styles

Trifecta Box *3 horses picked*
Any of 3 Horses Must Win AND
Any of 3 Horses Must Place AND
Any of 3 Horses Must Show

| Horse | | Win | Place | Show | <=Order of Finish |
|---|---|---|---|---|---|
| Horse 1, 2 or 3 | Win | Collect | Collect | Collect | |
| Horse 1, 2 or 3 | Place | Collect | Collect | Collect | |
| Horse 1, 2 or 3 | Show | Collect | Collect | Collect | |

Trifecta Box with Keyed Horse *3 horses picked*
Any of 3 Horses Must Win AND
Any of 3 Horses Must Place AND
Any of 3 Horses Must Show

| Horse | | Win | Place | Show | <=Order of Finish |
|---|---|---|---|---|---|
| Horse 1 | Win | Collect | Lose | Lose | |
| Horse 2 or 3 | Place | Lose | Collect | Collect | |
| Horse 2 or 3 | Show | Lose | Collect | Collect | |

Trifecta Box with Keyed Horse *4 horses picked*
Pick $1 Keyed to Win (Same concept applies to Place and Show Keys) Any of remaining 3 Horses must Place AND
Any of remaining 3 Horses must Show

| Horse | | Win | Place | Show | <=Order of Finish |
|---|---|---|---|---|---|
| Horse 1 | Win | Collect | Lose | Lose | |
| Horse 2, 3 or 4 | Place | Lose | Collect | Collect | |
| Horse 2, 3 or 4 | Show | Lose | Collect | Collect | |

Trifecta Part Wheel 3x4x5 *5 horses picked*
Pick $1, 2 or 3 to Win
Pick $1, 2, 3 or 4 to Place
Pick $1, 2, 3, 4 or 5 to Show

| Horse | | Win | Place | Show | <=Order of Finish |
|---|---|---|---|---|---|
| Horse 1, 2, 3 | Win | Collect | Lose | Lose | |
| Horse 1, 2, 3, 4 | Place | Collect | Collect | Lose | |
| Horse 1, 2, 3, 4 or 5 | Show | Collect | Collect | Collect | |

Superfecta Box with Keyed Horse *4 horses picked*
Pick $1 Keyed to Win (Same concept Applies to Place and Show Keys) Any of Remaining 3 Horses Must Place AND
Any Remaining 3 Horses Must Show AND
Any Remaining 3 Horses Must Finish Fourth

| Horse | | Win | Place | Show | Fourth | <=Order of Finish |
|---|---|---|---|---|---|---|
| Horse 1 | Win | Collect | Lose | Lose | Lose | |
| Horse 2, 3 or 4 | Place | Lose | Collect | Collect | Collect | |
| Horse 2, 3 or 4 | Show | Lose | Collect | Collect | Collect | |
| Horse 2, 3 or 4 | Fourth | Lose | Collect | Collect | Collect | |

Fig. 3

Multi-race Bets

Daily Double — Winners of Two Consecutive Races on one Bet. Must Win BOTH Races

| Race | | Win | Place | Show | |
|---|---|---|---|---|---|
| Race 1 | | Win | Place | Show | <= Order of Finish |
| | Win | Collect | Lose | Lose | |
| | Place | Lose | Lose | Lose | |
| | Show | Lose | Lose | Lose | |
| Race 2 | | Win | Place | Show | <= Order of Finish |
| | Win | Collect | Lose | Lose | |
| | Place | Lose | Lose | Lose | |
| | Show | Lose | Lose | Lose | |

Pick 3 — Winners of Three Consecutive Races on one bet. Must Win all Three Races

| Race | | Win | Place | Show | |
|---|---|---|---|---|---|
| Race 1 | | Win | Place | Show | <= Order of Finish |
| | Win | Collect | Lose | Lose | |
| | Place | Lose | Lose | Lose | |
| | Show | Lose | Lose | Lose | |
| Race 2 | | Win | Place | Show | <= Order of Finish |
| | Win | Collect | Lose | Lose | |
| | Place | Lose | Lose | Lose | |
| | Show | Lose | Lose | Lose | |
| Race 3 | | Win | Place | Show | <= Order of Finish |
| | Win | Collect | Lose | Lose | |
| | Place | Lose | Lose | Lose | |
| | Show | Lose | Lose | Lose | |

Pick 4, Pick 5, Pick 6 - Same basic formats for winning and Part Wheel Wagers

Wagering Styles

Part Wheel 1 with 6, 7
Race 1: The 1 Horse must come in First AND
Race 2: Either the 6 or 7 Horse must come in First

| Race | | Win | Place | Show | |
|---|---|---|---|---|---|
| Race 1 Horse 1 | | Win | Place | Show | <= Order of Finish |
| | Win | Collect | Lose | Lose | |
| | Place | Lose | Lose | Lose | |
| | Show | Lose | Lose | Lose | |
| Race 2 Horse 6 or 7 | | Win | Place | Show | <= Order of Finish |
| | Win | Collect | Lose | Lose | |
| | Place | Lose | Lose | Lose | |
| | Show | Lose | Lose | Lose | |

Part Wheel 1, 2 with 6, 7
Race 1: Either the 1 or 2 Horse must come in First AND
Race 2: Either the 6 or 7 Horse must come in First

| Race | | Win | Place | Show | |
|---|---|---|---|---|---|
| Race 1 Horse 1 | | Win | Place | Show | <= Order of Finish |
| | Win | Collect | Lose | Lose | |
| | Place | Lose | Lose | Lose | |
| | Show | Lose | Lose | Lose | |
| Race 2 Horse 6 or 7 | | Win | Place | Show | <= Order of Finish |
| | Win | Collect | Lose | Lose | |
| | Place | Lose | Lose | Lose | |
| | Show | Lose | Lose | Lose | |

Part Wheel 1, 2 with 4 with 5, 6, 7
Race 1: Either the 1 or 2 Horse must come in First AND
Race 2: The 4 Horse must come in First
Race 2: Either the 5, 6 or 7 Horse must come in First

| Race | | Win | Place | Show | |
|---|---|---|---|---|---|
| Race 1 Horse 1 | | Win | Place | Show | <= Order of Finish |
| | Win | Collect | Lose | Lose | |
| | Place | Lose | Lose | Lose | |
| | Show | Lose | Lose | Lose | |
| Race 2 Horse 4 | | Win | Place | Show | <= Order of Finish |
| | Win | Collect | Lose | Lose | |
| | Place | Lose | Lose | Lose | |
| | Show | Lose | Lose | Lose | |
| Race Horse 5, 6 or 7 | | Win | Place | Show | <= Order of Finish |
| | Win | Collect | Lose | Lose | |
| | Place | Lose | Lose | Lose | |
| | Show | Lose | Lose | Lose | |

METHOD AND SYSTEM FOR PLACING A WAGER ON A PARI-MUTUEL EVENT

RELATED APPLICATIONS

This is a continuation of U.S. application Ser. No. 12/315,786 filed on Dec. 4, 2008 now U.S. Pat. No. 8,241,114 the contents of which are hereby incorporated by reference.

FIELD OF THE INVENTION

This invention relates to interactive wagering systems and more particularly to providing an interactive expert handicapper's prognosis to players to permit them to formulate or construct complicated exotic wagers and to aggregate a wager with those of other players to satisfy wagering minimums so that a player can take advantage of many different wagering opportunities and can place wagers previously beyond the player's financial capabilities.

BACKGROUND OF THE INVENTION

Wagering on pari-mutuel horse racing is a very difficult and time consuming activity. It entails the detailed handicapping of the merits of each horse, jockey, trainer and breeder in addition to the track and distance being run. In addition to the difficulties encountered in handicapping the race, placing a wager can be an extremely complicated endeavor as well. Wagering terms can be as intimidating as understanding the wager they represent.

Consequently, the novice player in the sport is at a serious disadvantage to other participants with more experience, especially with respect to multiple race or multiple horse wagers. Although there are a great number of handicapping aids available to the novice player provided by experts in the field of handicapping, none give advice on the structure of multiple race or multiple horse wagers. These types of wagers require a level of expertise to understand the handicapping information that is beyond the scope of most novice players. Additionally, these handicapping aids offer information on specific horses in each race and not how to construct specific wagers that relate to the handicapping information. As a result, one of the most popular forms of handicapping/wagering aids is the quick pick. With a quick pick a random number generator is used to predict the outcome of the race without respect to any handicapping information. A quick pick is nothing more than an uneducated guess provided by the pari-mutuel wagering system.

Accordingly, novice players tend to be unsuccessful in their wagering, and as a result the sport of horse racing has stagnated, if not declined, in popularity over the last decade.

At a track, the participant may elect to go to a betting window to place a bet, or to take advantage of a self-service terminal to place a wager. Win, Place and Show bets are commonly referred to as straight bets and are easy to understand as they relate respectively to a first, second or third place finish. A common wager on a straight bet is $2.

With greater knowledge of the horses in a particular race, a player can attempt to predict in which order various horses will place. Additionally, players may attempt to predict not only the order of finishers in a single race, but the finishers over the span of multiple races. These wagers are known as "exotics". In an exotic wager, the player is increasing the odds for success by placing wagers on multiple horses. In addition to exotic wagers in a single race, participants may also place wagers on finishers in multiple races.

The more the selections made by the player, the more the cost of the wager increases, and does so commensurately for each race. For example, an exacta is a wager in which the player must pick the first two finishing horses in the order of their finish. In other words, the player must pick the horse that wins and the horse that finishes second. Since the player is now betting on two horses, one to win and another to place, the wager costs twice as much. A $2 exacta wager costs $2. A "box" is wagering term denoting a combination bet whereby all possible numeric combinations are covered. If a player favors two horses but is not sure which will win and which will place, a box allows the player the opportunity to wager on both horses. If either horse wins and the other places, the player wins the bet. An exacta box with $2 wagers on each outcome would cost the player $4. As the wager becomes more complex the probability of success increases because more possible outcomes of the race are accounted for. However, the cost of the wager increases significantly. Tables showing some of the types of exotic wagers and the construction of these wagers is provided in FIGS. 1-3 and illustrates not only the complexity of the wager structure, but also increase in the cost of the wager.

In summary, at a track, the participant may elect to go to a betting window to place a bet, or to take advantage of a self-service terminal to place a wager. In either approach, the participant selects a specific horse to wager upon. Betting on multiple horses, or multiple races, an exotic wager, must be built in accordance to the participants preferences for each race. This process is often very complicated and intimidating to the novice participant.

There are a number of factors in the stagnation of growth in the horse racing industry including the increasing prevalence of alternative wagering opportunities. Aside from the competitive pressure exerted by these outside influences, horse racing faces several challenges to increasing interest in the sport and correspondingly positioning as a wagering interest of choice by the general public. These challenges are as follows:

1) The Difficulty for a Person not Acquainted with the Sport to Understand Horse Racing Wagering Terminology.

Win, Place and Show bets are commonly referred to as straight bets and are easy to understand as they relate respectively to a first, second or third place finish. Even then, a novice may not understand that placing a bet for a horse to Place (finish second) will provide a return on the wager regardless of where the horse finishes in the top three positions. With greater knowledge of the horses in a particular race, an experienced handicapper can attempt to predict in which order various horses will place. Additionally, a very experienced handicapper may attempt to predict not only the order of finishers in a single race, but the finishers over the span of multiple races. These wagers are known as "exotics". The names of these wagers can be as intimidating as the definitions are complex. Names for exotic wagers like Exacta, Quinella, Trifecta, and Superfecta may sound foreign to the neophyte and become even more daunting when used in combination with other wagering styles such as "Box", "Wheel" or "Key". According to *Horse Racing for Dummies*; "one of the most popular betting styles is keying a horse. Most horses are keyed in the win position, meaning you're confident the horse will win the race, so you key the horse to win in a vertical exotic wager and use other horses in the second, third and fourth spots underneath. For example, you may key a horse to win in the exacta and then put some horses in the place hole."

In addition to exotic wagers in a single race, participants may also place wagers on finishers in multiple races. Picking the correct winners in two consecutive races is known as the “Daily Double”. Variations on this theme include Pick 3, 4, 5 or 6 in which the winners of the number of consecutive races is picked.

Combining the concept of a Pick 3 with a keyed horse results in a wager that might look like this example: A $1 dollar pick 3, the 2 horse with the 3-4-5 with the 3-4-5-6. This means the 2 horse must win the first leg of your pick 3, either the 3-4 or 5 must win the second leg and the 3-4-5 or 6 must win the third leg to win your bet. The same concept applies to exactas, daily doubles, trifectas, superfectas, and pick 4's.

While confusing and intimidating to the novice, it is important to understand why these wagers and styles exist. In the 1950's about 95 percent of all wagers were either win, place or show and the only exotic wager was the daily double. The daily double was invented by racetrack managers trying to invent bets that would lead to larger payoffs. In 1971 Hollywood Park pioneered the first exacta. Since exotics provide the handicapper with the means of getting a much higher return on a wager, they have become very popular. Today, 70 percent of all wagers are exotics.

Obviously a great deal of skill is required not only to understand the concept, but to be able to put the concept into practice. While multi-race bets and wheeling, keying and boxing horses in exotic bets may be popular at the track amongst experienced handicappers, it may require a great deal of perseverance on the part of the novice to gain the experience to understand the concepts. Unfortunately for the novice, the easiest wagers to understand also provide the lowest return on investment for their wager.

2) The Extremely Complex Methodologies for Successfully Handicapping the Merits of the Horses and Jockeys in a Race and Thereby Make an Educated Prediction on the Outcome Difficult.

Experienced handicappers utilize a number of different data types to analyze each individual horse, in each individual race. Many businesses now provide detailed Information on each horse and their past performances. Complicated software analyzes past performances and the statistics for trainers and jockeys and compiles speed ratings, pace ratings, projected speed ratings and any number of other indicators important to the professional handicapper.

While all of these products are available to the novice to increase their understanding for individual horses, they do not necessarily apply to the exotics. Moreover, almost all require that the participant purchase handicapping systems or handicappers picks. Consequently to increase their understanding of the sport, and thereby participate in higher return wagers and styles, exotic wagers require a monetary investment to obtain educational materials, and both concentrated effort and practice to master these skills.

3) The Cost of Opening an ADW Account and the Cost of Exotic Wagers.

In addition to the learning curve associated with mastering the complexities of handicapping, the monetary requirements of an Advanced Deposit Wagering (ADW) interface to a pari-mutuel wagering system for account registration prior to actual participation in wagering on an event present another obstacle to the industry in attracting new participants. One of the most popular ADW operators, Youbet.com requires a monthly fee of up to $17.95 simply to use the service. Although a participant can use the service for a 60 day trial period for free, and the service fees are waved if the participant wagers over $350/month, it still requires a $30 minimum deposit.

4) Affordability of Exotic Wagers.

Exotic wagers are more expensive than straight bets. Oftentimes players cannot afford the minimums established by the tracks for the exotic wagers. As a result some players forego the exotics altogether due to the minimums involved.

It would therefore be beneficial to both the pari-mutuel wagering industry, and prospective participants who may be intrigued by the sport but intimidated by its complexity and cost, to offer a simplified means to:

1. Learn about the sport and get expert advice from professionals on a range of exotic wagering options and styles without paying for the education 2. Practice with these professionals with the opportunity to win a prize when they have made a correct wager selection without having to pay for the experience.

3. Open an account without having to deposit any money in advance.

4. Place a wager on the exact proposition that the expert offers through a simplified wagering format that doesn't require any advance monetary investment.

5. Place subsequent wagers on monies earned through a plurality of media.

6. Provide a method for aggregating wagers to provide the ability for a player to aggregate his wager with those of other players, thus to provide the individual with the ability to meet minimums established by a pari-mutuel facility.

SUMMARY OF THE INVENTION

The subject invention provides an automatic internet-based system and method by which the novice player can easily utilize the knowledge and experience of a professional handicapper by electronically presenting the player with one or more exotic wagering propositions for a multiple horse or a multiple race wager based on a handicapper's prognosis. The handicapper's proposition is derived from a specific handicapper's analysis of the race being run and his expertise in constructing an exotic wager. This permits the player to use the information from an expert and place the bet with a single selection, normally the selection of the exotic wager formulated by the handicapper.

More specifically, this invention envisages a computer-based system and interface (the “System Interface”) which facilitates the selection of a predefined outcome of a pari-mutuel event from a range of outcomes offered by the operator of a pari-mutuel wagering system or the promoter of a contest or promotional event.

The predefined outcome that is presented to the player is determined by an expert prognosticator, or handicapper. This system of outcome selection provides the user with the ability to select a pari-mutuel outcome or ProPick on both simple and complex scenarios without requiring the skill of an expert handicapper.

In one embodiment, the ProPick is presented as a wager on the pari-mutuel wagering system. In this embodiment it is not required that the pari-mutuel wagering system be used for account wagering and is adapted for use on point-of-sale devices (POS) systems and ticket issuing machines (TIM's) common in the pari-mutuel industry for the acceptance of wagers. The system interface in this embodiment maintains the table of ProPicks to be offered by the pari-mutuel wagering system. These wagering selections are displayed as an option on the POS or TIM.

In another embodiment, the subject invention also provides the player with the ability to place a wager at less than the full price of the wager that is required by the pari-mutuel facility accepting the wager. This is done by aggregating the wagers of multiple players before processing the wager to the pari-mutuel facility, with the winnings split proportionately among the players. A player can thus take advantage of many different wagering opportunities that previously would have been beyond his or her financial capability.

As part of the subject invention, a system is also provided for multi-track betting with a single wager. Additionally, ratings of the handicappers or their success rates is presented to the player. Further, the convenience of using handheld communication devices is made possible by SMS communication. Also part of the subject invention is the use of his subject system for promotions or contests. The subject invention also contemplates aggregated win, place and show bets with exotic wagers.

The subject system and method thus provide an electronic mechanism by which the novice player can easily place an exotic wager by presenting the player with prognostications from a handicapper expert in exotic wagers. The novice player places his wager by selecting from a range of wagering propositions presented to him by a handicapper for a multiple horse or a multiple race exotic wager. While exotic wagers may offer the player the best odds for success, they can be prohibitively expensive for the novice player, and aggregation with other players makes wagering affordable.

BRIEF DESCRIPTION OF THE DRAWINGS

The above and other objects and advantages of the present invention will be apparent upon consideration of the following Detailed Description, taken in conjunction with the accompanying Drawings of which:

FIGS. 1-3 are tables illustrating bet types and wagering styles, illustrating the complexity of exotic wagers;

DETAILED DESCRIPTION OF THE INVENTION

Figure 4:
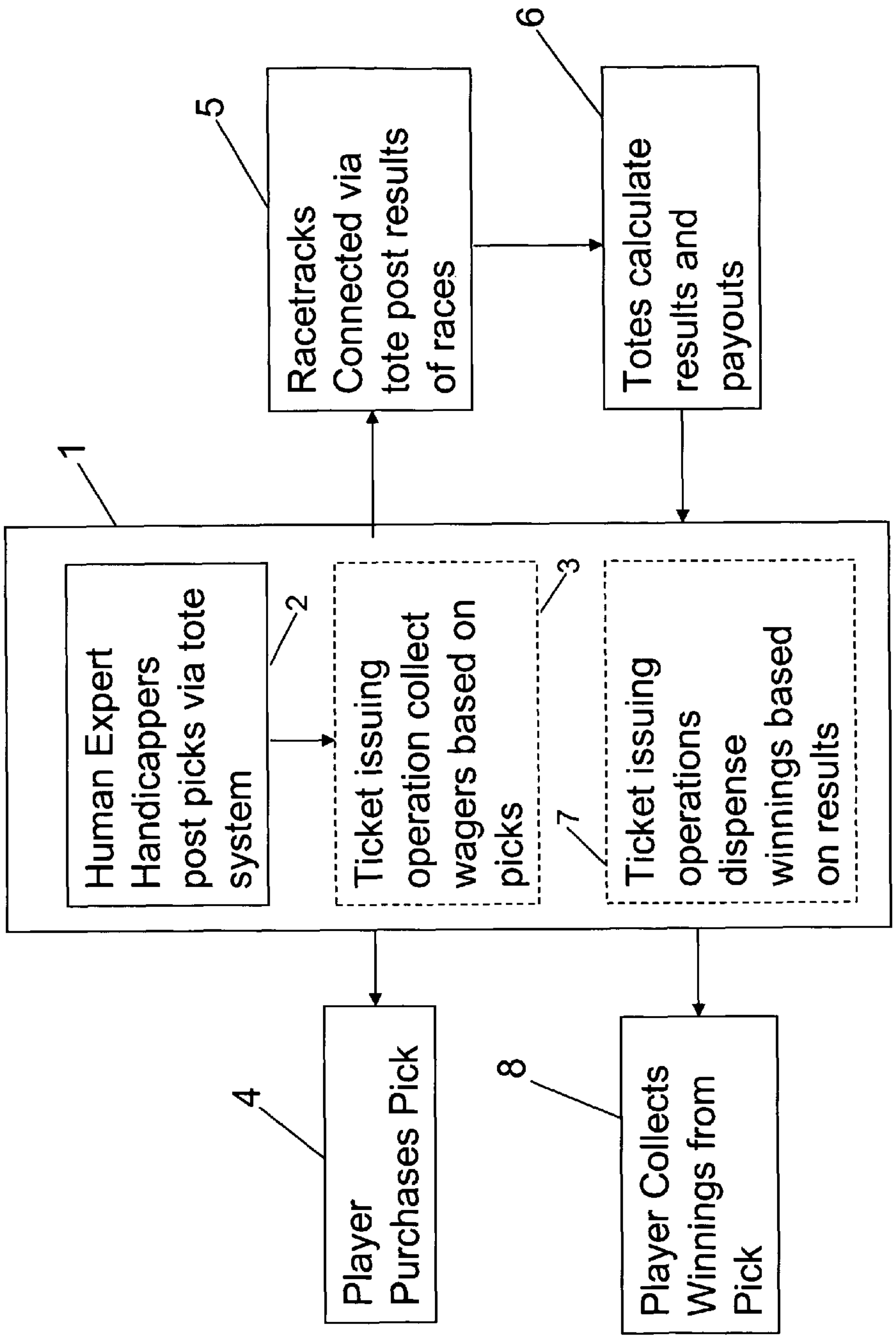
FIG. 4 is a block diagram of the subject ProPick system in which an expert or handicapper provides an expert prognostication displayed to a player from which he selects from a plurality of prognostications the one desired, after which the wager is made with a track either directly, through a point of sale terminal or TIM, or for off track betting through an ADM, also indicating the possibility of aggregating wagers from multiple players and distributing the proceeds.

By way of further background, while wagering on sporting events such as horse and dog, racing is a popular leisure activity, it is sometimes inconvenient to attend racing events in person. For this reason the pari-mutuel industry began offering Advance Deposit Wagering as a means to allow participants the ability to place a wager from a location remote from where the event takes place. As relates to this invention, "advance deposit wagering", or ADW, means a form of wagering in which a licensed ADW entity is authorized to accept deposit money from an account holder and then use the balance to fund wagers. The player can then contact the licensee from a location without actually being physically present at the licensee's premises in order to communicate the desired use of those funds for wagering purposes.

ADW has been a very successful offering by the racing industry to attract additional participants and allow them to wager on events that they would not have had the opportunity to do so previously. ADW is now legal in up to 34 different states in one form or another. In 2006, the ADW hubs in Oregon alone processed wagers (also known as handle) in excess of $1.4 billion. The promotion of horse racing and pari-mutuel wagering on television has been very successful as well. The two leaders in this market are Horse Racing TV (HRTV) in association with Express Bet and Trackside Live in association with TVG. In 2006, HRTV which launched in January of 2003 generated a total handle in excess of $152 Million. During the same period, TVG, which is owned by parent company Gemstar TV Guide International, realized a betting handle of $433 Million from distribution to 18.8 Million subscribers.

Despite the relative success of television related pari-mutuel wagering enterprises, the overall industry has stagnated, if not declined. While the total amount wagered on pari-mutuel Thoroughbred racing rebounded 1.5% in 2006 to $14.785 Billion, the industry is below its all time peak of $15.180 billion in 2002. During this same period the amount wagered at track locations has plummeted from $2.9 Billion in 1996 to $1.6 Billion in 2006. In summary, fewer people are attending live events while more money is being wagered off-track and through ADW. However, the increase in off-track betting handle has not resulted in a substantial increase in the overall performance of the horse racing industry. Since the year 2000, the industry has only grown 3.2% from $14.321 Billion to $14.785 Billion in handle. As will be described the subject invention relates to exotic wagers and aggregation to promote pari-mutuel horse racing industry.

Referring now to FIGS. 1-3 what is seen are tables relating to the types of bets and the wagering styles to indicate the complexity with which a wager can be constructed.

As can be seen straight bets are relatively straight forward, thus the name. If one places a bet for a horse to "win" and the horse wins then the player collects, otherwise for "place" and "show" finishes the player loses.

When placing a bet on a horse to "place," the player wins if the horse either wins or places. If the player bets on the horse to "show" and the horse either wins, places or shows the player collects.

This type of wagering is obviously simple and most novice players have no problem with this structure.

However, there are other types of wagering styles. For instance an across-the-board bet can be constructed in which the same bet is placed on each of three straight bet types. FIG. 1 shows a different pay out structure for across-the-board bets as opposed to straight bets.

Add to this exotic bets such as an Exacta in which as the name suggests horses are picked on the exact order of finishing. If the horses do in fact finish in the manner specified, the payouts are quite a bit larger than straight bets.

For example, in an Exacta bet one picks horse #1 to win and horse #2 to place. If horse #1 wins and horse #2 places then as can be seen from the chart the player collects. Otherwise the player does not collect. The fascination for exotic bets such as the Exacta is that the odds are much higher and therefore the payouts considerably larger.

As can also be seen, the amount of complexity is increased and therefore the payouts increased for an Exacta in which two horses are picked (called a Quinella) or an Exacta Box where two or more horses are picked to finish in both the Win and Place positions, or an Exacta Box with keyed horses in which one horse is picked to Win and multiple horses are picked to Place or an Exacta Wheel in which multiple horses are picked around a horse selected to Place Referring now to FIG. 2, another type of wager is a Trifecta in which three horses are picked with an exact order of finishing. The betting can be further complicated with Trifecta Boxes for three horses picked, a Trifecta Box with a keyed horse in which three horses are picked, a Trifecta Box with a keyed horse in which more than 3 horses are picked, a Trifecta Part Wheel 3×, 4×, 5 in which five horses are picked, and a Superfecta Box with keyed horse in which four horses are picked. With each layer of complexity the payout goes up due to the larger odds.

To this level of complexity can be added multi-race complexity shown in FIG. 3. Here, as is well known, the Daily Double means one must have winners of two consecutive races on one bet in which the particular horse must win both races. There is a so called "Pick 3" in which the winner of three consecutive races on one bet means that the particular horses selected must win all three races.

Also included in these exotic races are Part Wheels, for instance 1 with 6, 7, 1 and 2, 6, 7, and 1 and 2 with 4, 5, 6, 7. The Part Wheels described above have many opportunities to lose and only one opportunity to win with the odds of this occurring exceedingly low. Therefore, if one selects correctly, one has a correspondingly large payout.

As mentioned before, the ability to intelligently pick in exotic wagering is so complex that most novices will opt to simply place straight bets. However, the lure of better payouts is strong and exotic wagering is becoming more popular.

However, those participating in exotic wagering most often lose than win. Expert handicappers on the other hand can increase the odds of winning in these complicated Exacta wagering scenarios.

Referring to FIG. 4, in one embodiment a Propick system 10 includes input from an expert or handicapper 12 based on race information 14 which involves inputs from a totalisator and statistics having to do with the particular race or races. The expert or handicapper provides a prognostication that results in a wagering proposition or ProPick. This ProPick may constitute a sample or an exotic wager, or a combination thereof, 16. The wagering proposition provided by the handicapper can for instance involve a single horse, multiple horses, multiple races, and a combination of 1, 2 and 3. Note each ProPick includes the odds, or a rating, that indicate the payoff. In one embodiment the ProPick is identified as coming from a particular handicapper by the handicappers ID.

Player 18 is provided with the ProPick wagering proposition on the display 20 from which he can select the particular wagering proposition he wants to bet on. This selection is shown at 22.

Upon selection, a wager is placed at 24, is passed to either the track 26 or the betting window, or is passed to either an ADM contractually controlled by the operator of the ProPick system, a point of sale terminal or a ticket issuing machine TIM 28. Upon reconciliation, the winnings are made available to the player as illustrated at 30.

As can be seen from this diagram the handicapper analyzes a race or set of races and provides a wagering proposition based on his analysis of race information. Picking a wagering proposition from a particular handicapper for a particular race or set of races is made easy by displaying not only the wagering proposition which may be meaningless to the novice, but more importantly the track record of the handicapper or his success rate. Thus a novice knowing nothing of exotics makes his picks based on either the handicapper he trusts or his track records.

Figure 5:
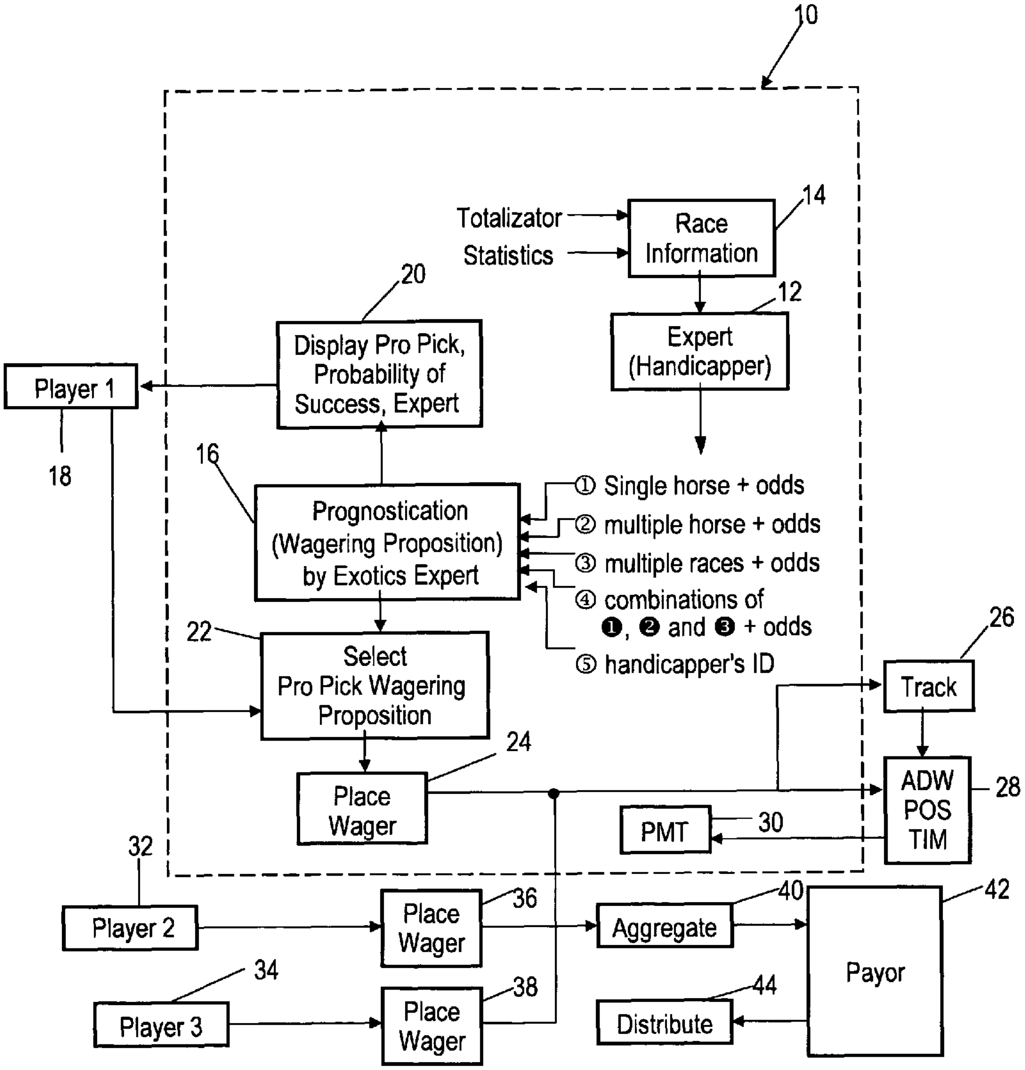
FIG. 5 is a block diagram of the subject ProPick system in which an expert or handicapper provides an expert prognostication displayed to a player from which he selects from a plurality of prognostications the one desired, after which the wager is made with a track either directly, through a point of sale terminal or TIM, or for off track betting through an ADM, also indicating the possibility of aggregating wagers from multiple players and distributing the proceeds.

Referring to FIG. 5, more particularly and in one embodiment a Propick system 10 includes input from an expert or handicapper 12 based on race information 14 which involves inputs from a totalisator and statistics having to do with the particular race or races. The expert or handicapper provides a prognostication that results in a wagering proposition or ProPick. This ProPick constitutes an exotic wager 16. The exotic wagering proposition provided by the handicapper can for instance involve a single horse, multiple horses, multiple races, and a combination of 1 2 and 3. Note each ProPick includes the odds that indicate the payoff. In one embodiment the ProPick is identified as coming from a particular handicapper by the handicappers ID.

ProPicks

The operation of the subject system is now more fully described. In the subject invention an expert handicapper provides the system with one or more suggested wagering propositions or ProPicks on specific races, along with a rating of the probability of success for each wager and the anticipated payout. The player upon presentation with the wagering proposition then places the wager either through an on-track or an Advance Deposit Wagering interface to the pari-mutuel wagering system with a single selection. In one embodiment, the handicapper's track record is presented so that a player can simply select the pick from a selected expert/handicapper. This process greatly simplifies the wagering activity and provides the player with a far greater probability of success.

As a result, the invention provides a system and offers a method through which the racing industry can attract new participants in pari-mutuel wagering through the simplification of education and wagering concepts.

Aggregation

As far as aggregation is concerned, the subject invention provides the novice player with the ability to take advantage of a ProPick wager at a reduced cost per wager. Alternatively, he may place a number of wagers spanning a number of races also at a reduced cost. In order to decrease the cost of a ProPick offering one or more complex exotic wagers, in one embodiment the subject system aggregates wagers from a number of different players such that each player can wager less than the minimum wager amount required by the track.

For example, consider an experienced handicapper betting on races on Saturday May 19, 2007 at the Belmont Park Race Track. The following wagers spanned the entire race card: nine separate $1 Exacta Boxes costing $108; nine separate $1 Trifecta Boxes costing $192; and two $4 Pick 4 wagers costing $340. The total amount wagered is $640. Assume for the sake of example that the Exacta Boxes won $132.10 for a net win of $24.10; the Trifecta wagers won $76.75 for a loss of $115.25 and the Pick 4 wagers won $479.50. Some wagers are winners, others are losers. However, on $640 wagered, the net win was $388.35. For the novice player, the wagers that were placed are not only too complex, but far too expensive.

However, according to the subject invention, in one embodiment, a novice player can limit his costs by simply selecting a single wager or ProPick representing all of the aggregated wagers he wants to place. He would then place a bet within his budget for the day and enjoy a full card of racing. If the budget for the day is $100, the player would select a wager and $100 would be placed in the aggregated wager pool maintained by an aggregated wager pool system. The aggregated wagers are then placed by the system into the pari-mutuel pool. Successful wagers are collected by the system from the pool payouts and then distributed to the players based upon the amount of their wagers. In this example, the player's initial bankroll of $100 would yield a net win of $100/$640 or $60.67.

System Interface

In one embodiment, the ProPick system involves a system interface which displays an identification number, descriptive text of the wager, or graphic representation on a variety of pari-mutuel wagering system input devices or contest and promotion applications. The system interface translates the ProPick in terms appropriate to the pari-mutuel system. The system interface communicates the translated ProPick to the pari-mutuel system for processing. Upon conclusion of the pari-mutuel event, the system interface receives the results of the event and the disposition of the ProPick and records it in a database containing the ProPick and the handicapper responsible for the prognostication. This information may be used to analyze the effectiveness of the handicapper's ability to accurately predict event outcomes.

In a further embodiment, the system interface facilitates the opening of a promotion or contest tracking account for a promotion or contest based upon a horse racing prognostication application. In this embodiment, a participant selects the ProPick of a pari-mutuel event from a range of outcomes offered by the contest promoter. The contest promoter may solicit participation in the contest through a plurality of mediums including television, radio and the Internet. Participants utilize a discreet destination device ID, typically a phone number, to which a Short Message System (SMS) message is sent. This device ID may relate to a unique, predefined contest selection based upon the ProPick for the pari-mutuel event, or to the prognosticator determining the ProPick. A table is maintained in a database on the system interface correlating the destination device ID to the contest selection.

Also included in the database table are the posted ProPicks, the handicapper responsible for determining the ProPick, the prize award criteria and other information deemed relevant to the operator. Due to legal and regulatory requirements, prizes may be based on jurisdictional regulations and the prize awards are in compliance with those regulations.

In the above scenario, upon receipt of the SMS communication, the system interface records the contest selection and the corresponding originating device ID in the table. Upon conclusion of the event, the outcome is compared with the participant's selection. If the participant is deemed to have won a prize, an SMS communication is generated by the system instructing the participant to access an Internet website to register to collect their prize. The participant then enters the registration information on the website and the prize is subsequently delivered. In the process of registration, an account is created which may be used for further promotions, contests and other advertising and merchandising marketing opportunities.

In another embodiment, the opening of the promotion and contest tracking account facilitates the opening of a wagering account that subsequently allows participants to place wagers, through a plurality of communication mechanisms via digital devices supporting the Short Message System architecture, to a system capable of processing account-based, pari-mutuel wagers.

In another embodiment of the invention, under a contractual agreement with the operator of the ProPick system, the ADW provider offers a list of ProPicks from which the participant may choose. As with the contest embodiment of the invention, each proposition in the list of ProPicks may be associated with a destination device ID. After opening their account, a participant may desire to place a wager based upon a ProPick. This is accomplished by sending an SMS communication to the pari-mutuel wagering system operator. This destination number may be a discreet ID used only for wagering, or a code may be inserted in the body of the SMS message signifying that the ProPick is to be used for a wager placement rather than a contest selection. In the latter case, the system interface will recognize the code and follow the instructions to place a wager instead of making a contest selection.

In this way fewer numbers may be required to support both contest and wagering applications. The participant's originating device ID is used to identify the participant and his or her associated account number stored on the system interface and the pari-mutuel wagering system. This account is stored on a database and contains the participant's details as required by jurisdiction and an account history of the participant's wagering activity.

A password, which was selected during registration process, and stored on the database corresponding to the participant's wagering account, is supplied by the participant and contained in the body of the SMS message to ensure the authentication of the participant. The system interface communicates the password, account and wagering instructions to the pari-mutuel wagering system, which then validates the account and processes the wager. An amount is charged to the SMS originating device ID by the SMS service provider or other third party. This amount corresponds to the amount of the wager, plus any charges levied by the provider of the SMS service plan to which the participant subscribes to and/or an SMS charge levied by the SMS service provider that the pari-mutuel wagering system operator subscribes to.

An amount corresponding to the amount of the wager is then deposited into the participant's pari-mutuel wagering account by the SMS provider, the pari-mutuel system operator's account or a third party holding account. If deposited into the pari-mutuel system operator's account or a third party holding account, the funds are subsequently deposited into the participants wagering account.

The SMS service provider, or third party, bills the participant directly for the amount of the wager and all applicable SMS charges. The system interface maintains a table for each specific ProPick and translates the appropriate ProPick into a format appropriate for processing by the pari-mutuel wagering system.

The pari-mutuel system then deducts the wager amount from the participant account and places the wager as communicated by the system interface to the pari-mutuel wagering system. A confirmation of the wager is returned by the pari-mutuel wagering system to the system interface which then relays the confirmation to the participant via an SMS reply message. Since this SMS related billing process culminates in the deposit of the required funds into a wagering account, the account is not required to have any previously deposited available funds in order for the participant to take advantage of the ProPick presented. Upon conclusion of the pari-mutuel event, the wager is reconciled with the outcome of the event, and any proceeds due to the participant are automatically deposited into the participants wagering account by the pari-mutuel account wagering system provider, and an SMS message is sent to inform the participant of the outcome. Although the account, and all wagering activity, resides on the pari-mutuel wagering system, the system interface records all activity on the system in a separate database residing on the system interface.

In another embodiment, the destination device ID corresponds to the prognosticator offering the ProPick. In this embodiment, specific instructions for either the contest selection or wager placement are contained in the body of the SMS communication.

As to use of the subject invention by ADWs under contract and control of the ProPick entity, the operator of an ADW system may utilize the invention with the promotion of contests related to pari-mutuel events or offer wagering opportunities to the participants as their comfort with the pari-mutuel wagering experience increases. Advice would be communicated to the novice participant by expert handicappers offering both contest and wagering opportunities. The opinions of the handicappers could be communicated over any medium including television, radio and web or Podcast. Due to the complexities of handicapping, quite often there will be divergence in the opinions of the panel as to the outcome of the event, and as to the type of wager to be placed on a particular event. Each member of the panel may have a different wagering proposition that they would advise, especially for a complicated multi-race exotic. It is possible that all propositions may result in a winning outcome. However, correspondingly all propositions may result in a losing outcome. Each handicapper would explain the handicapping rationale behind the selection and the probability of success for each of the propositions. The individual participant is free to select the handicapper(s) outcome that that the participant would agree with. To make the learning experience more interesting for the novice, a contest could be constructed whereby the participant selects the proposition favored by a particular handicapper(s). The participant's selection would be conveyed to the promoter via the SMS communications described herein. Early in the educational process the participant would participate in a contest where various levels or prizes would be awarded corresponding to the level of understanding (correct selections) displayed by the participant. These awards could range from additional educational materials to promotional wagers supplied by the ADW operator.

Having made a number of correct selections, the participant may move from the contest mode of the invention to the actual wagering mode. The participant may now place a wager without having to fund the wagering account. The wager will be charged via the SMS billing aspect. The participant selects the wager as before but utilizes a destination device ID that also corresponds to a wager selection and amount instead of a contest selection. A password is used to ensure proper authentication of the participant. Upon a successful selection, winning funds are automatically transferred into the participants account. The participant now has the options of placing wagers via the destination ID, specifying an incremental amount to be added to that wager in the body of the SMS message or placing a wager through any number of means as offered by the ADW provider.

It will be appreciated that as far as the subject system is concerned the ADW is under contract with the subject wagering entity in which the subject wagering entity controls the ADW for the purpose of the wagering transactions. Interalia, the contract includes a contractual objection to accept aggregated wagers from the subject wagering entity and to pay out the winnings to the subject wagering entity.

While this example relates to wagering on races at a single track, in another embodiment, multiple wagers that may be simple or complex, and take place at multiple tracks, may be offered as a single wager. The subject system would aggregate the wagers as in the previous example, and then place the wagers to the appropriate tracks. Upon conclusion of the various races at all of the tracks the winnings would be distributed by the same method as above.

Although intended to facilitate the placement of higher priced exotic wagers, the subject system may be used to aggregate wagers for both Win, Place, Show bets in conjunction with exotic wagers, thereby expanding the total realm of wagering opportunities to encompass all of the various wagers available.

More specifically, in one embodiment the subject invention provides one or more suggested wagers on specific races, along with the cost for each wager based upon the structure of the wager and the track minimum wager amounts wager type. The system calculates acceptable partial wager amounts based on the wager that a player may select and based on aggregating the wagers of multiple players. The player has the option of placing the wager for the entire amount determined by the wager structure, which in most cases is cost prohibitive, or the option of placing his wager for the partial amount offered. The player then places the wager through the system. The system aggregates all of the wagers, and subsequently places the wagers, through an on-track, off-track, or an Advance Deposit Wagering interface, to the pari-mutuel wagering system as a single selection. This process greatly simplifies the wagering activity by providing the player with the opportunity to take advantage of a wagering activity that previously may have been too expensive to undertake.

Referring back to FIG. 4, as mentioned hereinbefore, it is possible to aggregate wagers from a number of players, here shown at 32 and 34, who place wagers 36 and 38 along with wager 24. The wagers are aggregated at 40 and transmitted to a payor entity 42 which is associated with the track or ADM and which arranges to distribute the winnings as illustrated at 44. How this aggregation is achieved will be described hereinafter.

Figure 6A:
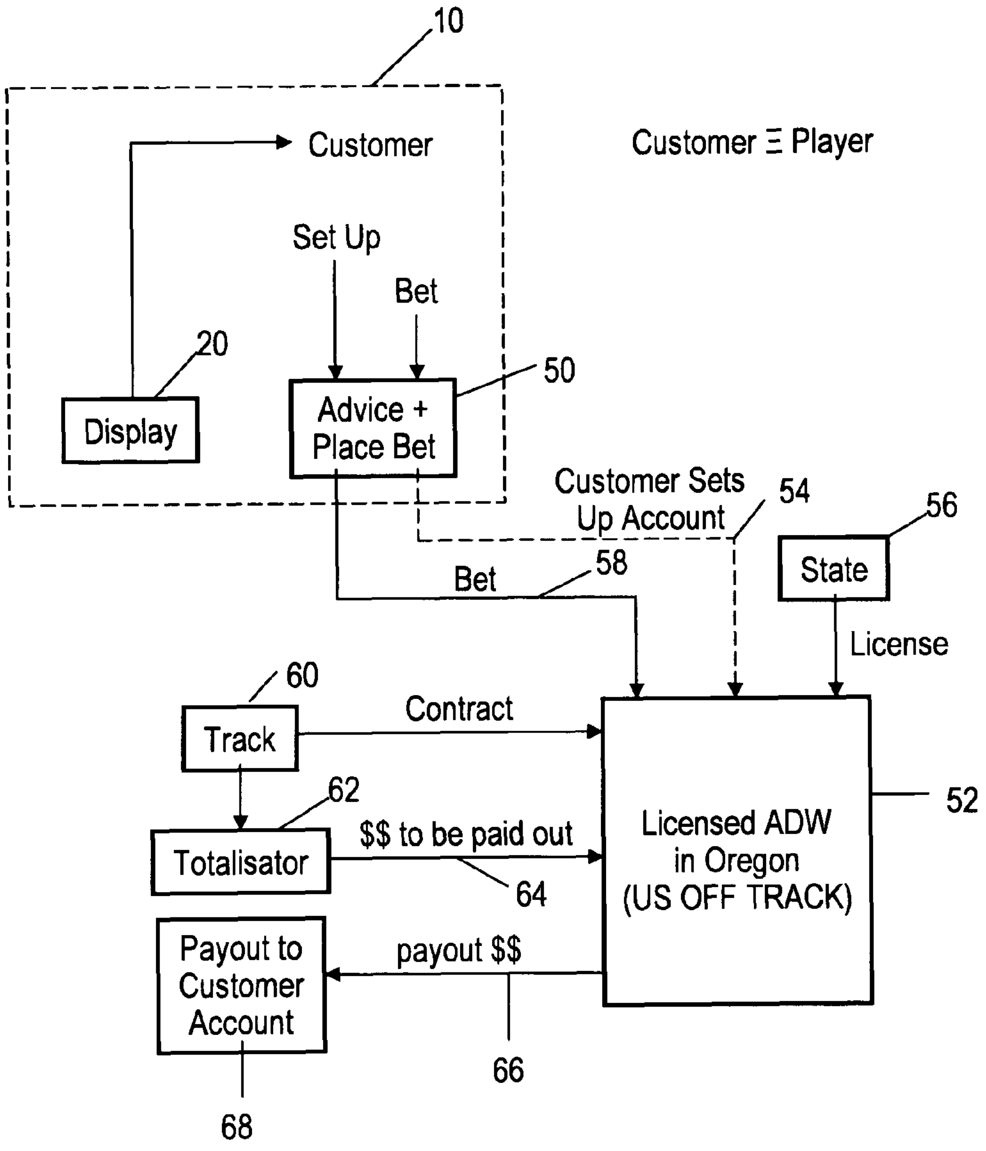
FIG. 6A is a block diagram of the placement of a ProPick wager through the utilization of a licensed ADW in which the customer is the player and in which the customer sets up an account and places a bet based on displayed prognostications by a selected handicapper, with the track contracting with the licensed ADW and providing a totalizator system coupled to the ADW, with the ADW being responsible for payout to the customer accounts.

Referring now to FIG. 6A, what is shown is the use of a licensed ADW for off-track betting, in which the customer is the player. Here the customer sets up his account and places his bet as illustrated at 50 based on the handicapper's prognostication. The account is set up at a licensed ADW 52 as illustrated by dotted line 54, with the ADW being licensed by the state as illustrated at 56.

The wager or bet is placed at the licensed ADW as illustrated by arrow 58, whereupon under contract with track 60, the outcome of the race is calculated at totalisator 62 which is coupled to the licensed ADW 52. The amount to be paid out is outputted by totalisator 62 to licensed ADW 52 as illustrated by arrow 64.

If there is a payout, licensed ADW will indicate the payout amount 66 to be paid into the customer's account as illustrated at 68.

Figure 6B:
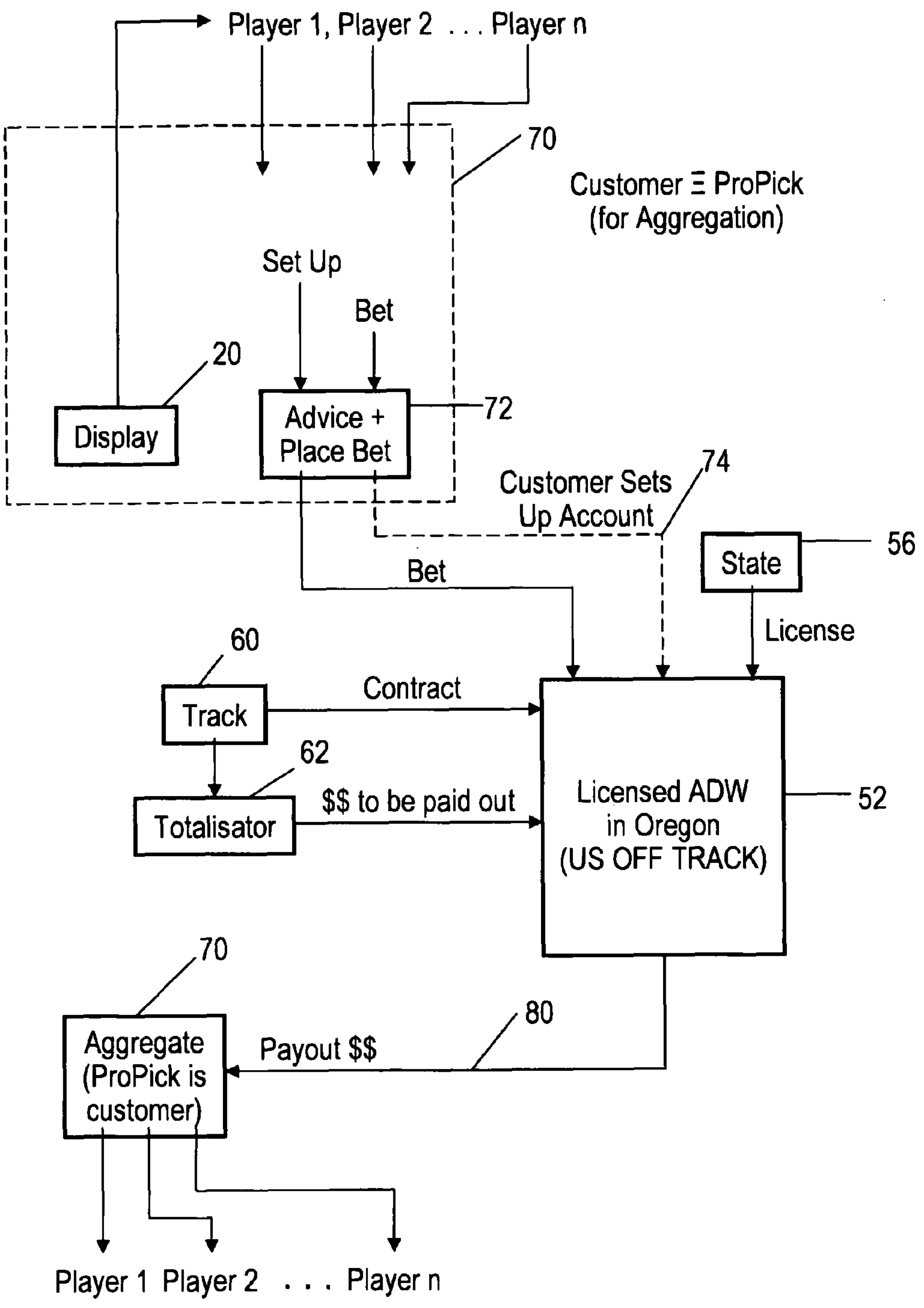
FIG. 6B is a block diagram of the system of FIG. 6A in which numbers of players contract with a ProPick entity to aggregate their wagers which interfaces with the licensed ADW, with the ADW paying any proceeds back to the ProPick who having aggregated the wager now pays the players accordingly.

On the other hand, for aggregation purposes and as illustrated in FIG. 6B a number of players, Player 1, Player 2, . . . Player n contract with a ProPick aggregator 70, with the ProPick aggregator setting up a customer account as indicated by line 74.

The handicappers prognostications are displayed to Players 1 to Player n, and a wager is set up through their selections. This wager is placed by the ProPick aggregation entity 70 with the licensed ADW. Again track 60 which contracts with the ADW provides via its totalisator 62 the results of the race and the amounts to be paid out by the licensed ADW, which in the indicated case is in Oregon and is U.S. Off-Track.

The payout at 80 is supplied back to the ProPick entity 70 which aggregates the payout and distributes the winnings to Players 1 to Player n.

Figure 6C:
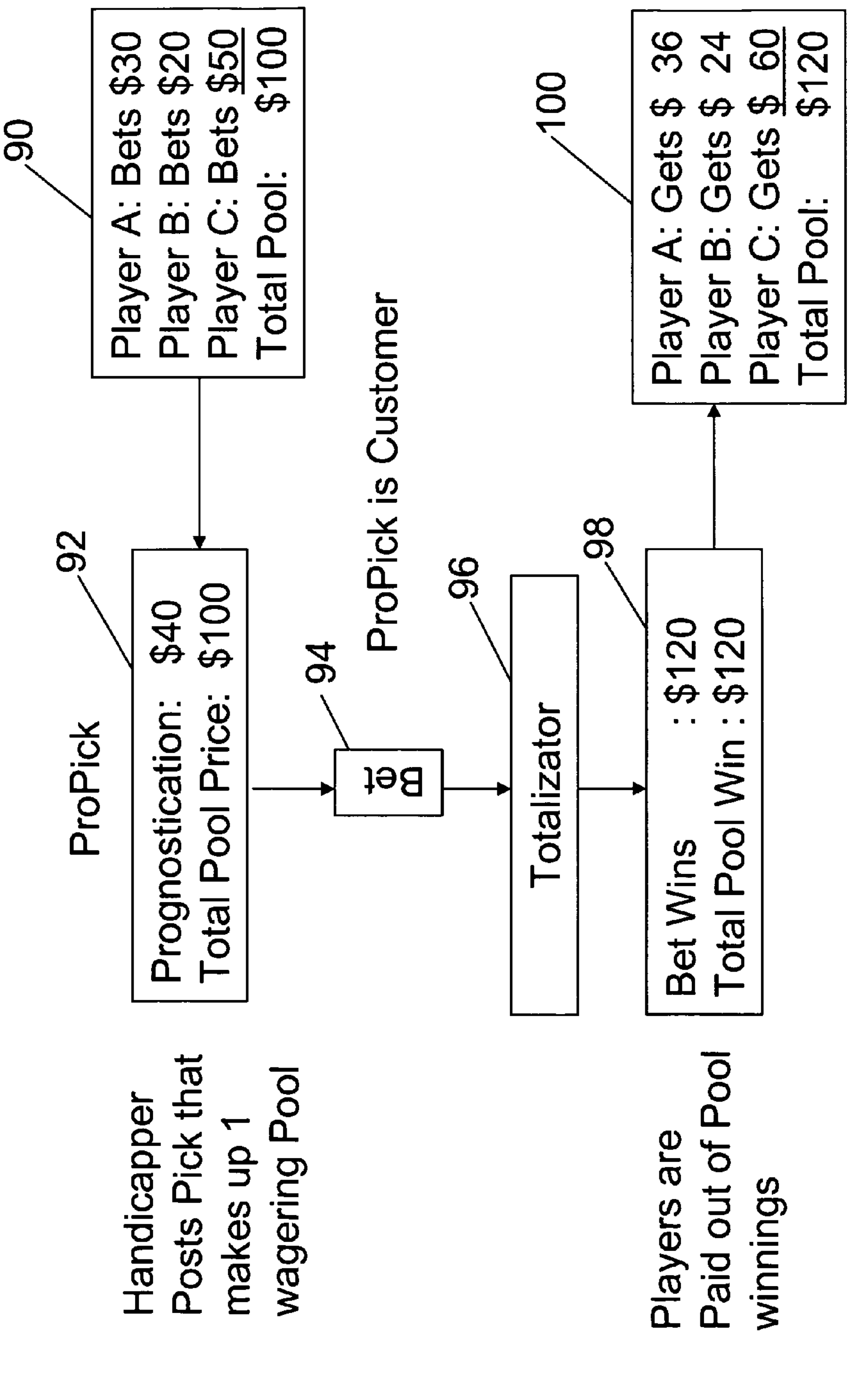
FIG. 6C is a block diagram illustrating the ability of a number of players to aggregate their bets so as to reach a minimum established by the track in which for a ProPick prognostication costing $40 and a total pool price of $100, the bet wins $120, split proportionally amongst the players who aggregated their bets.

Referring now to FIG. 6C, one simple way of aggregating wagers is shown for a simple wagering proposition generated by a handicapper. The wagering proposition involving a pick for a single wagering pool.

Here a number of players 90, namely Player A, Player B and Player C bet respectively $30, $20 and $50 to make up a total pool of $100.

As illustrated at 92 the cost of the wagering proposition is $40.

This wager is placed at 94 and through a totalisator 96. The totalisator computes that the particular bet in this case pays out $120 as illustrated at 98. If the bet wins, the players are paid out of pool winnings, namely $120, such that as illustrated at 100 Player A gets $36, Player B gets $24 and Player C gets $60. Thus the players are paid out in proportion to the amounts of their contributions to the pool.

Figure 6D:
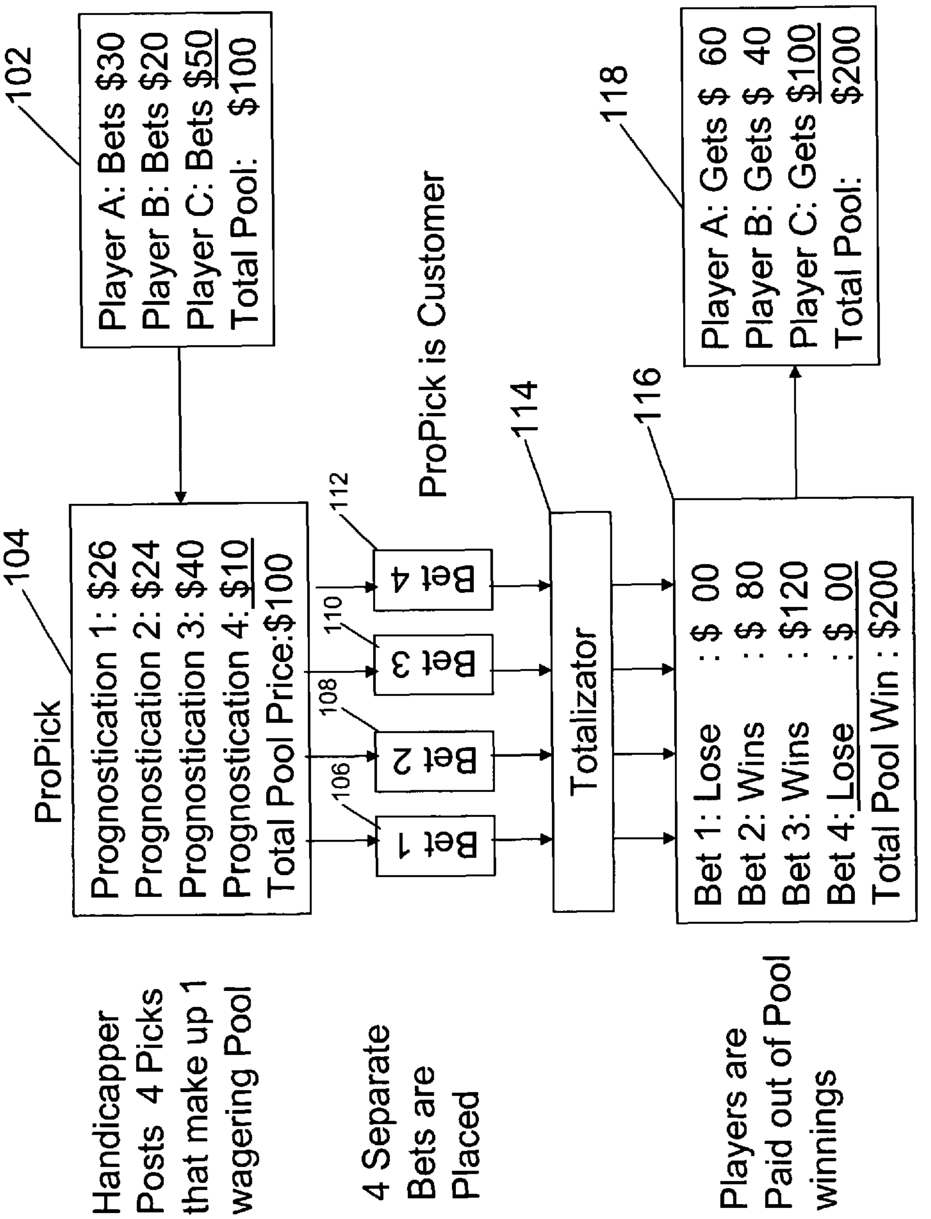
FIG. 6D is a block diagram involving presentation of a number of prognostications to a number of players who wish to have their wagers aggregated, in which for each prognostication the cost for the prognostication is illustrated, and in which four wagers are placed, with the winning bets paying out the indicated sums of money, with the winnings being apportioned across the aggregated players.

Referring now to FIG. 6D a more complicated aggregation scenario is illustrated. Here Players A, B, and C contribute $30, $20 and $50, for a total pool of $100.

The prognosticator produces 4 different prognostications corresponding to 4 different wagering propositions. In this example, the cost of the wagering prognostications are $26, $24, $40, and $10 respectively. Thus the total cost is $100.

The ProPick entity, here illustrated at 104, places 4 bets, as shown at 106, 108, 110 and 112. As calculated by totalisator 114, for the particular wagering propositions, bet 1 loses, bet 2 wins and pays $80, bet 3 wins and pays $120 and bet 4 loses. As illustrated at 116 the players are paid out of the pool in which the total pool win is $200. In the proportional calculation 118, Player A gets $60, Player B gets $40 and Player C gets $100 thus equaling the total pool of $200.

Figure 7:
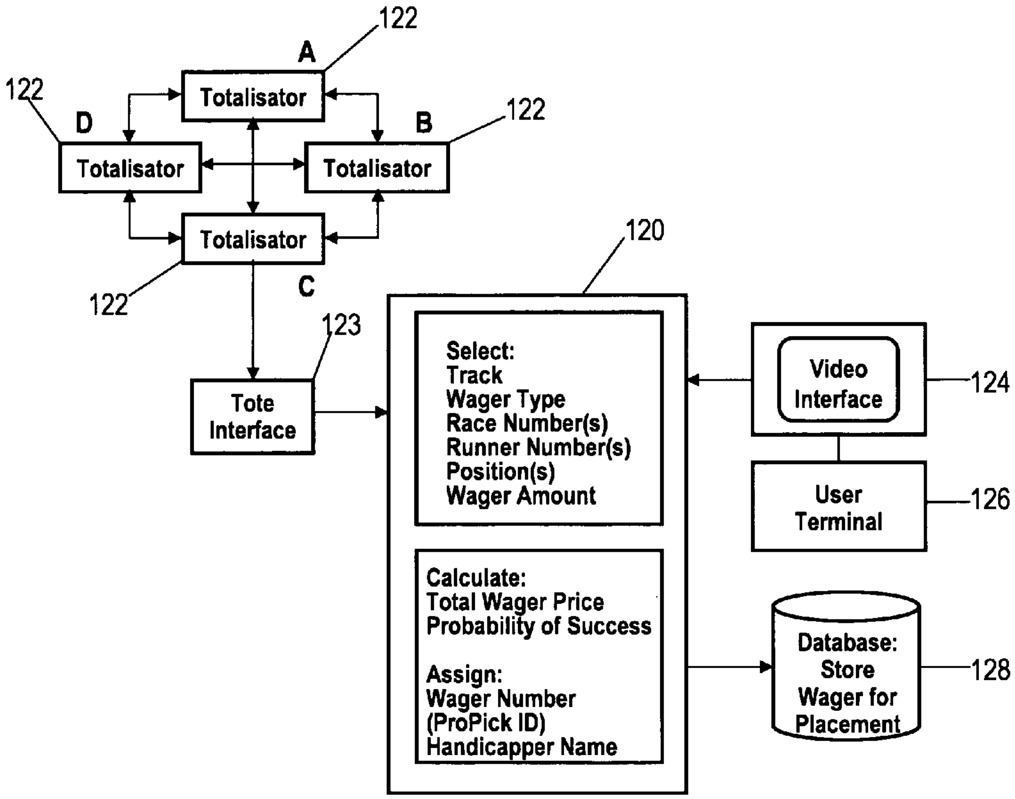
FIG. 7 is a schematic block diagram of a ProPick system constructed in accordance with the present invention illustrating the construction of a ProPick wager.

More particularly, and as shown in FIG. 7, ProPick system 120 uses wagering machines 122 known as "totalisators," such as totalisators 1A, 1B, 1C, and 1D. These totalisators generate wagering odds in realtime based on the wagers placed on racing events at various racetracks and off-track betting parlors (OTB's). Totalisators are available from companies such as Amtote International, Inc. of Hunt Valley, Md., Autotote Limited of Newark, De. and United Tote Company of Shepherd, Mt. Typically, each racetrack has an installed totalisator for handling the wagering odds and information at that track. Thus, totalisators 1A, 1B, 1C, and 1D are generally each located at a separate racetrack. Totalisators are also capable of communicating data between one another.

Typical racing data received from totalisator A includes the current race at each track, which races and tracks are open for wagering, the post times of each race, and the number of races associated with each track. Racing data from totalisator A also includes the win, place and show "pool" totals for each runner (e.g., a horse) and the exacta, trifecta, and quinella payoff predictions and pool totals for every runner combination.

Further racing data provided by totalisator A includes the number of runners in each race, the valid wager amounts accepted by totalisators A, B, C, and D, and valid wager types accepted by totalisators A, B, C, and D. Racing data provided by the totalisators also include a scratch list of those runners entered but removed from a race.

Preferably, additional "program information" (racing information typically provided in printed programs) may be provided from a totalisator. Such program information may include early odds, early scratches, race descriptions (including the distance of each race and the race surface-grass, dirt, artificial turf, etc.), allowed class ratings (based on a fixed ratio of external criteria), purse value (payoff to winning runner), allowed age range of runners, and the allowed number of wins and starts for each runner.

Transmission of the racing data between the totalisators and the ProPick system 120 may be available from a tote interface 123 via cable, satellite, or any suitable transmission medium with an adequate bandwidth to supply a large quantity of racing data in real-time.

The professional handicapper utilizes a terminal 126 and video interface 124 in combination with the information provided by the totalisators to construct and select various complex wager types, with the wagering propositions supplied to ProPick system 120. These wagers may be constructed to include multi-runner, multi-race or a combination of both types of wager. ProPick System 120 assembles the wager, whereupon the wager and the handicapper responsible for constructing the wager and stored in a database 128 with an associated ProPick ID (wager number) for future use.

Other racing data provided by the totalisators include race results, such as the order-of-finish list for at least the first three positions and payoff values versus a standard wager amount for win, place, and show, for each associated combination of the finish list. Also provided are payoff values for the winning complex wager types, including Exacta, Trifecta, Quinella, Pick-n (where n is the number of races involved in the pick-n wager), and Daily Double. The payoff values may also be accompanied by a synopsis of the associated finish list. This information is combined with the associated wager numbers (ProPick ID's) with a relative scale of probability of success and is stored in database 128.

The racing data that is received by ProPick system 120 is stored in memory, so that a microprocessor can process this information as desired by the user. The user controls the functions of ProPick system 120 via video interface 124.

Based on user commands received via user terminal 126, display and control circuitry displays various information on video interface 124.

User terminal 126 also has transaction data communication circuitry providing a two-way communications link between user terminal 126 and a totalisator via the ProPick system 120. Once the expert handicapper has constructed the ProPick and it has been stored in the database with an associated ID Number, it is ready for distribution for purchase.

Figure 8:
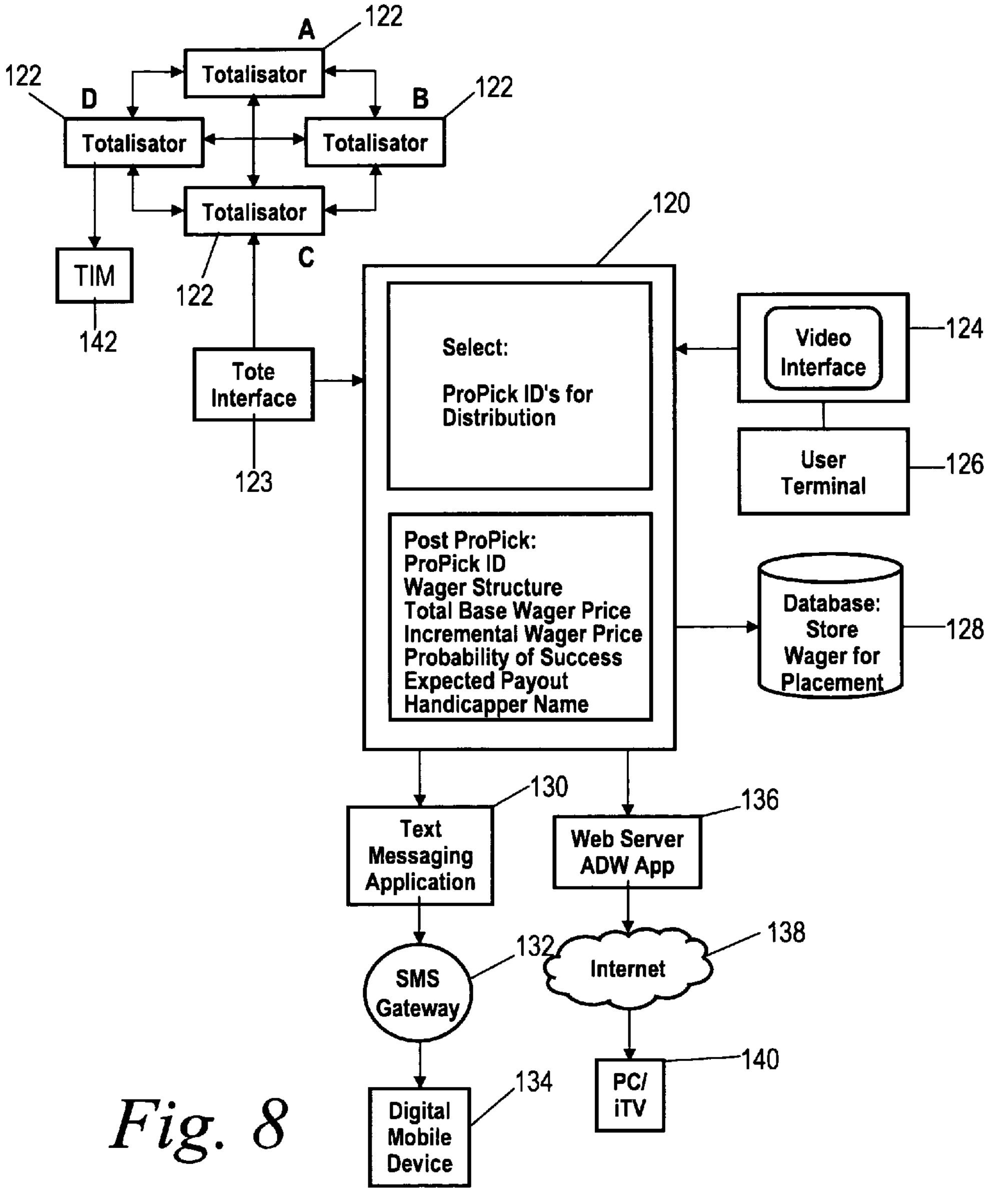
FIG. 8 is a schematic block diagram of the subject ProPick system illustrating the distribution of the ProPick wager through multiple channels of communications to wagering participants.

In FIG. 8 user terminal 126 and video interface 124 are used to access ProPick System 120. Via the video interface 124 the user selects the routing for the distribution of the ProPicks available for wagering. ProPicks stored in database 128 are then selected to be displayed on any one of a number of display devices through a plethora of communications mediums such as a text messaging application 130, an SMS gateway 132 and a digital mobile device 134. Likewise the communications medium may include a web server ADW application 136 coupled by the internet 138 to a PC or iTV 140. Also communication may be through a ticket issuing machine or TIM 142 coupled to a totalisator.

Utilizing tote interface 123 the totalizators 122 at any one, or all, of the racetracks and OTB's connected to totalisators A, B, C, and D may be selected to display and offer the ProPick selections. The ability to select a ProPick wager at each individual location is determined by previous contractual arrangement with the participating location. The ProPick selections would then be available at the participating racetracks and OTB parlors. Customers of the participating would have access to make a ProPick selection through one of any variety of wagering devices present at the location. Since these devices generally issue a receipt, or ticket, they are commonly referred to a ticket issuing machines, TIMs 142. The participant at the location would then purchase a ProPick from either a TIM operated by a clerk or a self service TIM 142 and receive a receipt of their wager. TIM 142 of FIG. 8 then places the wager into the totalisator system for processing. The totalisator system accepts the wager and a notice of the wager is sent to the ProPick system 120 where it is stored in database 128. In addition to the wager, information regarding the location where the wager was placed is documented for future use in the calculation of the amount of ProPick wagers placed by any given location Text messaging application 130 may also be used to distribute ProPicks for purchase. The Short Message Service is a service available over an SMS gateway on most digital mobile phones, other mobile devices 134 (e.g. a Pocket PC, or occasionally even desktop computers) and some fixed phones, that permits the sending of short messages between mobile phones, other handheld devices and even landline telephones Today, the public switching telephone network (PSTN), wireless networks, and private networks telephone services are based on the identification of the wireless telephone or wireline that a calling party uses. Services are personalized according to wireless telephone or wireline telephone number, where services associated with one telephone number are not accessible for another telephone number assigned to the same subscriber. For example, there is typically a first set of service features and billing options assigned to a home line number, a second set of service features and billing options assigned to an office line number, and a third set of service features and billing options assigned to a cellular telephone number. The networks process calls to and from each of these different subscriber telephones based on a separate telephone number.

One feature of telephone switching systems is the availability of service numbers. Service numbers may be subscribed to by businesses and individuals who are interested in providing a service via the telephone. For example, fortune tellers may subscribe to a service number. Service numbers typically utilize a distinct area code, such as "900" to indicate that additional charges may be incurred if dialed.

When an individual dials a service number, that individual is agreeing for a charge to be applied to the billing plan for the line number from which the call originates. For example, if an individual dials the service number for a fortune teller, the line number from which the individual dialed may be charged for each minute of service.

The Short Message Service enables a mobile subscriber in a mobile wireless network to send and receive short alphanumeric messages through his/her mobile station. The mobile station in the modern wireless networks can be a cellular phone, a personal digital assistant (PDA), a laptop or any portable device capable of communicating with the wireless network equipment and having an alphanumeric display. With the advent of integration of some of the functionalities of wireless communication services with the Internet, it is also possible to send and receive short messages from a fixed communication station such as an Internet-connected computer.

In one embodiment, text messaging application 130 formats the ProPick into an SMS format and routes it to SMS gateway 132 for distribution to digital mobile devices 134. Owners of the digital mobile devices 134 receive an SMS alerting them of ProPicks available for purchase. Additional information relating to the ProPick may be requested by the participant via reply SMS.

In order to place wagers, a user typically establishes an account associated with a totalisator (e.g., at a particular racetrack, OTB or ADW provider). The ProPick may also be purchased by the participant via reply SMS via a connection between text messaging application 130 and an advance deposit wagering (ADW) application 52 of FIGS. 6A and 6B.

The interactive wagering application provided by operators of advance deposit wagering (ADW) systems may provide wager creation screens for the user to use in creating wagers. The wager creation screens may have information areas. The information areas may be associated with menu items or options on the wager creation screens. For example, on a racetrack selection menu screen an information area may be associated with each available racetrack. On a race selection screen, there may be an information area associated with each available race option. Other screens such as wager type selection screens, wager amount selection screens, and horse selection screens, may also be provided with information areas. By interfacing ProPick system 120 with the Web Server/ADW Application 136, ProPicks may be offered to remote users via the Internet 138 through a PC or interactive TV (iTV) computing platform 140. The ProPick selection would simply be displayed as an available wagering option on the wager creation screen of the existing ADW application. A participant may request additional information relating to the ProPick through a standard web interface or purchase the ProPick selection through a mechanism consistent with the ADW operators wagering practice in relation to the participant's balance in their ADW account residing in the ADW application of FIGS. 6A and 6B.

Figure 9:
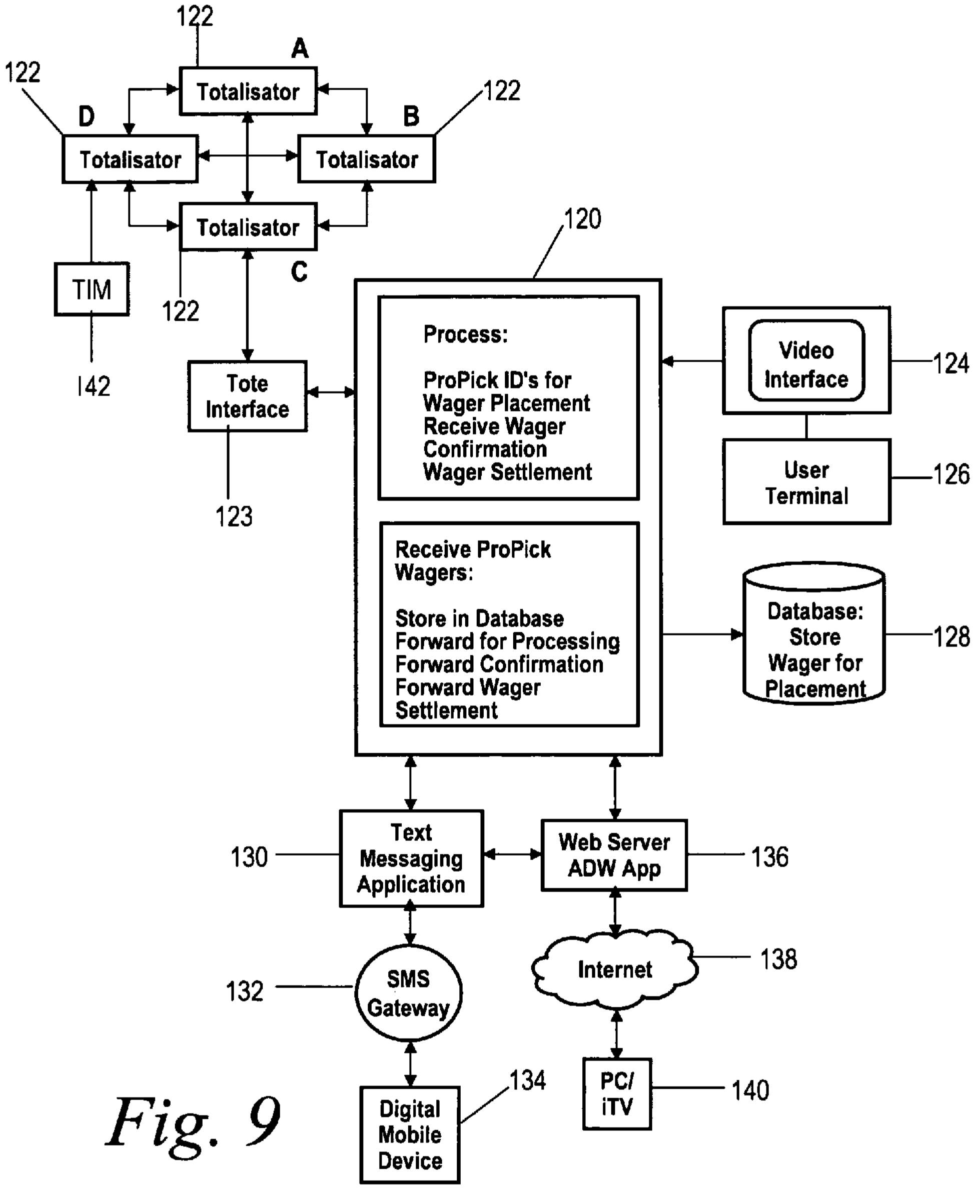
FIG. 9 is a schematic block diagram of the subject ProPick system illustrating wager settlements.

As shown in FIG. 9, in each instance, whether the ProPick is purchased utilizing text messaging application 130 and ADW application 52, or directly through ADW application 52, the ProPick system stores a record of the activity in the database 128 and forwards to wager to totalisators 122 via tote interface 123. As with a wager placed directly to a totalisator 122 via TIM 142, the tote interface forwards a wager confirmation to the ProPick system 120 where a record of the wager and confirmation is kept in the database 128. A notification of the wager and confirmation is sent to either, or both ADW application 52 or the text messaging application 130. If sent to ADW application 52, the confirmation is forwarded via the Internet 138 to the participant's PC/iTV computing platform 140. If sent to the text messaging system 130, the confirmation is sent via SMS gateway 132 to the participant's digital mobile device 134.

Upon conclusion of the event all wagers are settled through the totalisator system and notification is sent to the ProPick system. Accounts are adjusted in the ADW application and notification is sent either via the Internet or the text messaging application. All wagering activity is updated in the database. The operator of the ProPick system may make inquiries through ProPick system 120 to database 128 via user terminal 126 and the video interface 124. Inquiries regarding wagering activity, theoretical vs. actual probabilities of success and individual handicapper statistics may be displayed on the video interface 124 or redirected to any of a number of common output devices (not shown) for analysis.

As will be appreciated, the complex wager and the information pertaining to the wager is communicated to the Web Server and the Advance Deposit Wagering Application. In order to place wagers, a user typically establishes an account associated with a totalisator (e.g., at a particular racetrack, OTB or ADW provider). The complex wager may also be purchased by the participant via reply SMS via a connection between the text messaging application and the advance deposit wagering application 52.

The interactive wagering application provided by operators of advance deposit wagering systems may provide wager creation screens for the user to use in creating wagers. The wager creation screens may have information areas. The information areas may be associated with menu items or options on the wager creation screens. For example, on a racetrack selection menu screen, an information area may be associated with each available racetrack. On a race selection screen, there may be an information area associated with each available race option. Other screens such as wager type selection screens, wager amount selection screens, and horse selection screens, may also be provided with information areas. By interfacing the ProPick system with the Web Server/ADW Application, complex wagers may be offered to remote users via the Internet 138 through a PC or interactive TV (iTV) computing platform 140. The complex wager selection would simply be displayed as an available wagering option on the wager creation screen of the existing ADW application. A participant may request additional information relating to the complex wager through a standard web interface or purchase the complex wager selection through a mechanism consistent with the ADW operators wagering practice in relation to the participant's balance in their ADW account residing in the ADW application.

The ADW application selects the routing for the distribution of the complex wagers available for wagering. Complex wagers stored in database 128 are then selected to be displayed on any one of a number of display devices through a plethora of communications mediums including the Internet 138 for distribution to Internet devices including PC's and interactive Television's 140, and the SMS Gateway 132 for distribution to Digital Mobile Devices 134.

ADW Application 52 accepts the individual wagers from either the Internet 138 or the Text Messaging Application 130 for aggregation and processing by system 120. In each instance, whether the complex wager is purchased utilizing the text messaging application via the ADW application or directly through the ADW application, the complex wager system stores a record of each individual wager by customer and the amount of the aggregated wager in the database. The system forwards to wager to the totalisator system, via the tote interface, through the ADW APP. As with any common wager placed directly to the totalisator, the tote interface forwards a wager confirmation to the ADW complex wager system where a record of the wager(s) and confirmation is kept in the database. The notification of the wager and confirmation is sent to the ADW application and the confirmation is forwarded via the Internet to the participants PC/iTV computing platform or to the text messaging system where the confirmation is sent via the SMS gateway to the participant's digital mobile device.

Upon conclusion of the event all wagers are settled by the totalisator system via the tote interface to ADW 52. The wager aggregated wager settlement and notification is sent to ProPick system 120. ProPick system 120 then computes and allocates the winning wager amounts to the individual customer wagers. The individual payouts along with the appropriate customer information is forwarded to the ADW. Accounts are adjusted in the ADW and notification is sent either via the Internet or the text messaging application. All wagering activity is updated in the database. The operator of the ProPick system 120 may make inquiries through the system to the database via the user terminal and the video interface. Inquiries regarding wagering activity, theoretical vs. actual probabilities of success and individual handicapper statistics may be displayed on the video interface or redirected to any of a number of common output devices (not shown) for analysis.

Figure 10:
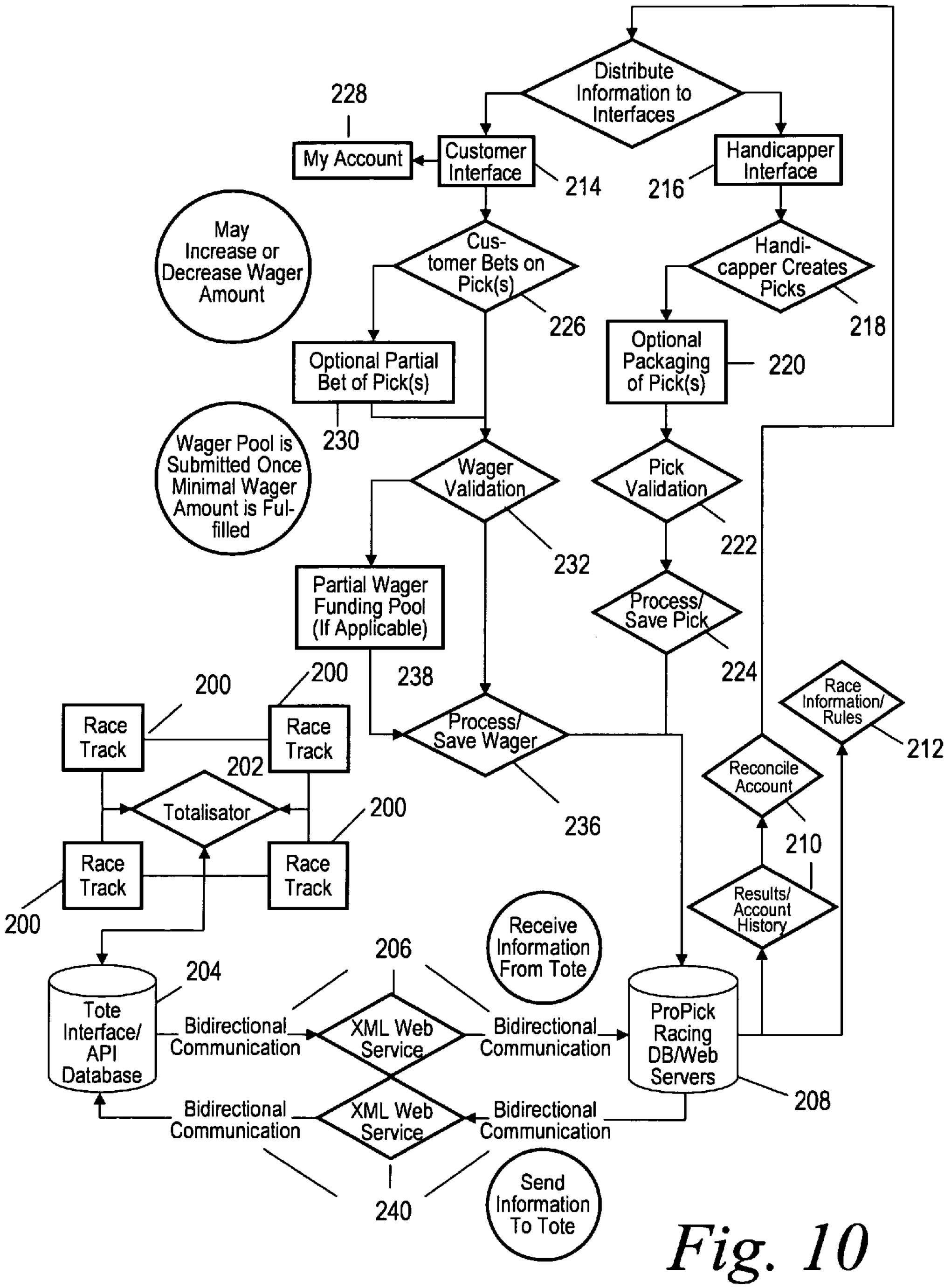
FIG. 10 is a flow chart depicting the processing and placement of the aggregated wager; and, FIG. 11 is a flow chart depicting the reconciliation of a successful aggregated wager and the allocation of proceeds to the players.

More particularly and referring now to FIG. 10, what is presented is a flow chart depiction of the inter-relationships and process flow of the ProPick System from creating a ProPick, to the subsequent customer selection of the ProPick, through the placement of the ProPick as a wager entered at the Track. Race tracks 200 provide information through the toalisator system 202 which is processed by a tote interface 204 through XML Web Services and Bidirectional Communications 206 to the ProPick Database and Web Servers 208. The ProPick System is a repository for customer accounting information 210 and Race information 212. From here, information is made available to the Customer via Interface 214 and to the Handicapper via Interface 216. Through the Handicapper interface 216 the professional views race information and creates a ProPick 218. The handicapper may select to package multiple picks into a single ProPick offering 220. The ProPick system performs a validation check 222 to ensure that the ProPick will be acceptable to the tote, then processes and saves the ProPick 224 to the Database and Web Servers 208 for access by a Customer through the Customer Interface 214, the Customer may review their Account 228 or sleet a ProPick to place a wager 226. The Customer may elect to place a wager amount less than the face value of the wager via a Partial Wager Funding function 230. The system then performs a wager validation 232 to ensure that there have been no changes in the circumstances surrounding the race that would affect the ProPick. If the wager is not a partial wager which must be funded, the wager is processed and saved at 236 in Database 208. If the Customer has elected to place a ProPick which requires aggregation of wagers to fund the ProPick, the system performs the funding function 238 prior to saving the wager at 236 in database 208. The once recorded in Database 208, the system utilizes XML Web Services and bi-directional communications 240 to place the wager through the tote interface 204 to the totalisator 202 and finally to the appropriate track 200. Upon successful placement of the ProPick wager to the track, an acknowledgement is generated by the totalisator 202 and is sent to the ProPick Racing Database and Web Servers 208 through the tote interface 204 and the XML Web Services and bidirectional communications 206. The acknowledgement is posted to the Customer Accounting function 210 which updates the Customer Account 228 and is accessible to the Customer via the Customer Interface 214.

Figure 11:
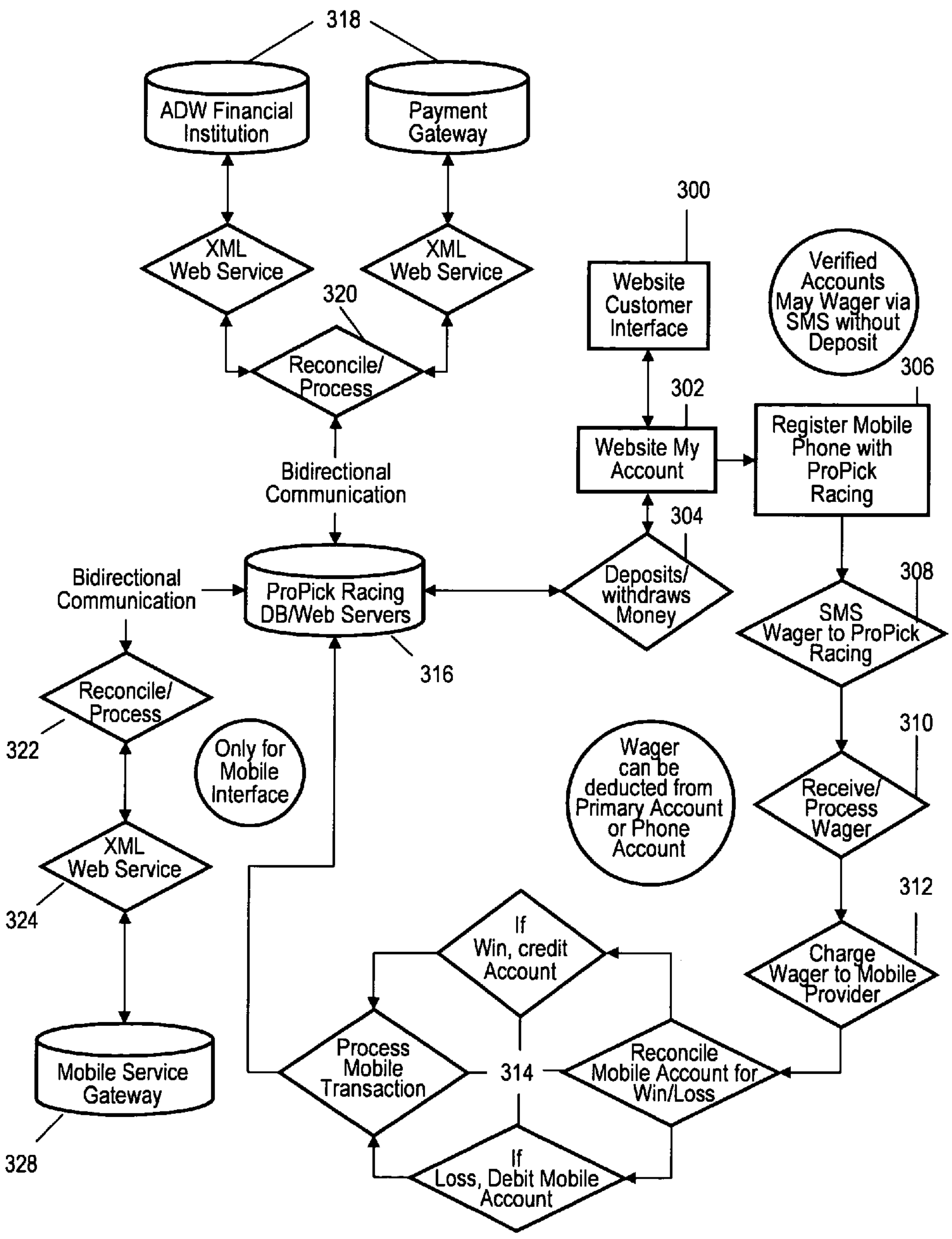

FIG. 11 is a flow chart depiction of the inter-relationships and process flow of the ProPick System for SMS or text message-based wagering. In this embodiment, the Customer has the ability to place a wager without funding an account. A Customer utilizes the Website Customer Interface 300 to access their account information 302 and deposit or withdraw money 304. The Customer may now register their mobile phone as shown at 306 with ProPick Racing to accept ProPick wager offers and subsequently place ProPick Wagers 308. The ProPick system Receives and Processes the Wager 310 and may elect to have the cost of the wager added to their monthly cellular bill that they receive from their mobile provider 312. Depending upon the provider, customer accounting may be performed within the cellular providers accounting system 314, or though the ADW and their related Financial Institution 318. In the former case, the wager reconciliation process 320 is handled by the ADW and their Financial Institution 318 and posted to the ProPick Racing DB and Web Servers 316 which updates the Customer's Account 302. In the latter case, the reconciliation process 322 is handled through XML Web Services 324 of the cellular provider to their Mobile Service Gateway 328. The Customer Account 302 is updated before with the appropriate accounting information being posted on the ProPick Racing Database and Web Servers 316 updating the Customer's Account 302.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. For use only in a pari-mutuel wagering system, a system for aggregating wagers in a pari-mutuel betting pool having a minimum acceptable wager amount as required by a track for placement in which odds are changeable until the wagering pool closes and in which payouts are based only on exact matches, comprising:

a display for presenting an individual as a single wagering opportunity the outcome of a wager in a pari-mutuel betting pool having a minimum acceptable wager amount in which odds are changeable until the wagering pool closes and in which payouts are based only on exact matches, the wager involving the picking of more than one horse, with the payout only upon an exact match of the picked horses;

an aggregator for aggregating pari-mutuel betting pool wagers from multiple players that would be less than the minimum acceptable wager amount as required by the track for placement; and, a wager placing unit for placing the wagers so as to provide players with the ability to place wagers in various denominations where previously they would not have been accepted.

2. The system of claim 1 wherein said display presents an individual a single wagering opportunity for an exotic wager involving one or more horses over a span of two or more races at the same racetrack.

3. The system of claim 1, wherein said display presents said individual a single wagering opportunity for an exotic wager, with the outcome of the exotic wager involving one or more horses over a span of two or more races at the same racetrack in conjunction with the outcome of a wager involving one horse or more than one horse within a single race at the same racetrack.

4. The system of claim 1, wherein said display presents said individual a single wagering opportunity for an exotic wager involving one or more horses over a span of two or more races at the same racetrack in conjunction with the outcome of a wager involving one or more than one horse within a single race at a different racetrack.

5. The system of claim 1, and further including a racetrack totalisator for obtaining wagering information via a totalisator interface.

6. The system of claim 1, wherein said display displays the probability of success for the wagering opportunities.

7. The system of claim 1, and further including a system interface for entering simple and exotic wagers for display to said individual as a single wager.

8. The system of claim 1, and further including at least one database.

9. The system of claim 1, and further including a communications network for placing said wager.

10. The system of claim 9, wherein the communications network includes the Internet.

11. The system of claim 7, and further including a system interface that automatically calculates and displays the minimum wager accepted by the track applicable to a predefined wager amount.

12. The system of claim 1, and further including a system interface and wherein partial wager costs for each wager are calculated by said system interface and are displayed to said individual.

13. The system of claim 1, wherein there is an anticipated partial amount payout for each wager and wherein the anticipated partial wager amount payout for each wager is calculated by a system interface and indicated to said individual based upon the partial wager amount.

14. The system of claim 1, wherein said aggregator aggregates partial wagers into a total wager amount.

15. The system of claim 1, and further including an Advance Deposit Wagering operator that maintains an account and wherein said account is accessed to augment the aggregated partial wagers in order to fulfill the minimum wager amount required by a racetrack operator to accept the wager.

16. The system of claim 1, and further including a network for interfacing to a computerized pari-mutuel wagering system supporting Advance Deposit Wagering.

17. The system of claim 1, and further including a pari-mutuel wagering system into which a wager is placed, said pari-mutuel wagering system accepting the proceeds of successful wagers.

18. The system of claim 15, and further including a distributor for distributing the proceeds of successful wagers to players in an account maintained by said Advance Deposit Wagering operator.

* * * * *